United States Patent [19]

Tanaka

[11] Patent Number: 5,592,489
[45] Date of Patent: Jan. 7, 1997

[54] DATA COMBINATION CIRCUIT DEVICE AND DATA COMBINATION METHOD

[75] Inventor: Masayuki Tanaka, Tokyo, Japan

[73] Assignee: Kabushiki Kaisha Toshiba, Kawasaki, Japan

[21] Appl. No.: 312,658

[22] Filed: Sep. 27, 1994

Related U.S. Application Data

[63] Continuation of Ser. No. 889,971, May 29, 1992, abandoned.

[30] Foreign Application Priority Data

May 31, 1991 [JP] Japan ..................... 3-129873

[51] Int. Cl.$^6$ ............................. H04Q 7/04; H04B 7/26
[52] U.S. Cl. ................ 370/458; 340/825.21; 379/59; 370/347
[58] Field of Search .................. 340/825.03, 825.04, 340/825.2, 825.21, 825.52, 825.53, 825.56; 370/60, 94.1, 95.1, 99, 106, 95.3; 379/59, 60; 455/33.1; 327/291, 293, 294, 295, 296, 407

[56] References Cited

U.S. PATENT DOCUMENTS

| | | | |
|---|---|---|---|
| 4,427,980 | 1/1984 | Fennell et al. | 340/825.52 |
| 5,008,953 | 4/1991 | Dahlin et al. | 379/60 |
| 5,042,082 | 8/1991 | Dahlin | 379/60 |
| 5,050,166 | 9/1991 | Cantoni et al. | 370/94.1 |
| 5,054,020 | 10/1991 | Meagher | 370/99 |
| 5,060,266 | 10/1991 | Dent | 379/59 |
| 5,146,214 | 9/1992 | Yamada et al. | 340/825.03 |

OTHER PUBLICATIONS

"Cellular System Dual–Mode Mobile Station—Base Station Compatibility Standard", EIA/TIA Interim Standard, Electronic Industries Association, Mar. 1991, pp. 7–12 and 85–87.

"Cellular System Dual–Mode Mobile Station—Base Station Compatibility Standard," Telecommunications Industry Association (Apr. 1992), pp. 9–13, 101, and 136.

*Primary Examiner*—Edwin C. Holloway, III
*Attorney, Agent, or Firm*—Banner & Witcoff, Ltd.

[57] ABSTRACT

A data combination circuit device includes an unfixed data shift register for shifting and outputting unfixed data, fixed data shift register for shifting and outputting fixed data independent of the unfixed data shift register, a timing signal generator for generating timing signals for causing the unfixed and fixed data shift registers to selectively shift and output data held therein in accordance with the format of slot data to be transmitted, and a buffer register additionally arranged for the fixed data shift register and designed to store fixed data formed by a CPU such that the data can be repeatedly output.

23 Claims, 4 Drawing Sheets

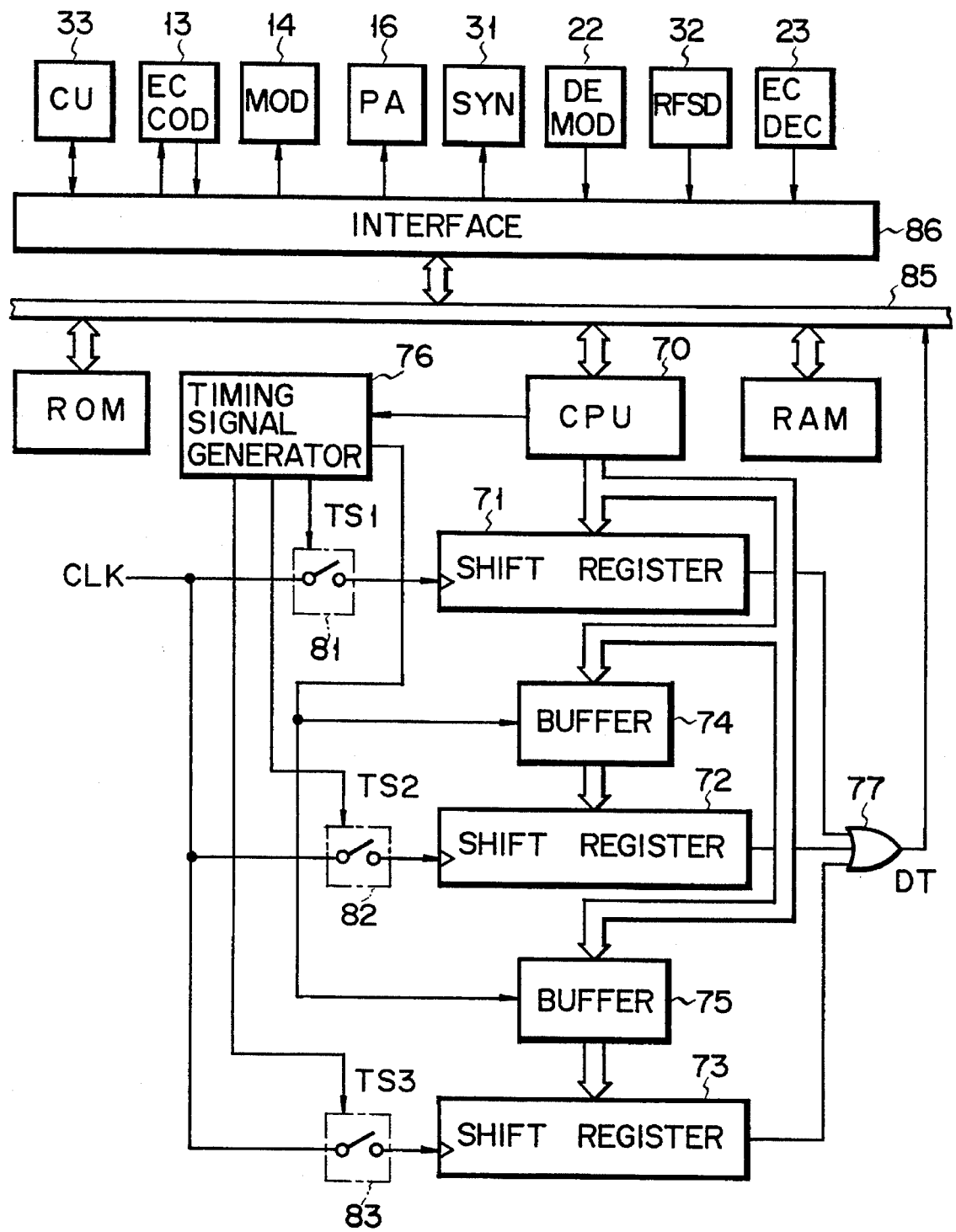
F I G. 3

FIG. 5

| 28 | 12 | 28 | 4 | 28 | 12 | 8 | 28 | 12 | 12 | 28 | 12 | 16 | 28 |
|---|---|---|---|---|---|---|---|---|---|---|---|---|---|
| SYNC | CDVCC | SYNC | OX4 | SYNC | CDVCC | OX8 | SYNC | CDVCC | OX12 | SYNC | CDVCC | OX16 | SYNC |

DATA COMBINATION CIRCUIT DEVICE AND DATA COMBINATION METHOD

This application is a continuation of application Ser. No. 07/889,971, filed May 29, 1992, now abandoned.

BACKGROUND OF THE INVENTION

1. Field of the Invention

The present invention relates to a data combination circuit device and a data combination method for combining a plurality of data to form slot data, in a base station or a mobile station used in a mobile radio communication system such as a portable or mobile telephone system or a cordless telephone.

2. Description of the Related Art

A digital type mobile radio communication system has recently been proposed as one of mobile radio communication systems. The technical requirements for this system are defined in the EIA/TIA Interim Standard IS-54A entitled *Cellular System Dual-Mode Mobile Station—Base Station Compatibility Standard* published by the Telecommunications Industry Association in March 1991. In a system of this type, not only control signals but also speech contents such as a speech voice are digitized, and the digital data is transmitted between a base station and a mobile station according to a TDMA (Time Division Multiple Access) scheme, thereby ensuring a privacy function, improving an affinity with data, and allowing effective use of radio frequencies.

According to a radio communication device of a mobile station used in a system of this type, a short burst is transmitted during a training period before speech communication. The short burst is a signal which is repeatedly transmitted from a mobile station to a base station at, e.g., 20-msec intervals to measure a propagation delay for an electric wave. For example, a short burst is formed of a sync signal and a collation code, both considered as fixed data, and measurement data as unfixed data. That is, the format of a short burst is totally different from that of slot data for speech communication. For this reason, a circuit in which the sync signal and collation code of slot data are inserted at fixed positions cannot cope with a short burst. Therefore, a short burst combination circuit must be additionally arranged.

As described above, the conventional data combination circuit device can effectively combine data to form slot data to be transmitted during speech communication but cannot cope with slot data having different formats such as a short burst.

SUMMARY OF THE INVENTION

It is an object of the present invention to provide a data combination circuit device which can effectively cope with a plurality of types of slot data having different formats with a simple arrangement.

According to the present invention, there is provided a data combination circuit device comprising a data hold circuit for temporarily holding unfixed data, a data memory circuit for storing fixed data such that the data can be repeatedly output, a readout control circuit, and a combination circuit, wherein the readout control circuit causes the data hold circuit and the data memory circuit to selectively and serially output unfixed data and fixed data. The data is output in a transmission slot period, at predetermined timings preset in accordance with the format of slot data to be transmitted. The serial data strings of the unfixed and fixed data are combined by the combination circuit, and the combined data is output as slot data.

According to the present invention, unfixed data is temporarily held in the data hold circuit, while fixed data is stored in the data memory circuit independent of the unfixed data such that the fixed data can be repeatedly output. Therefore, the fixed data and the unfixed data are respectively output in arbitrary orders by selectively performing readout control with respect to the data hold circuit and the data memory circuit at arbitrary timings. With this operation, slot data having an arbitrary format can be obtained by combining these data. That is, slot data having any format can be formed by properly controlling the readout timings of the data hold circuit and the data memory circuit. In addition, fixed data are stored in the data memory circuit such that the data can be repeatedly output. Therefore, once the CPU forms fixed data, it need not form them again. This reduces the processing load of the CPU.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a block diagram showing a data combination circuit device according to an embodiment of the present invention;

FIG. 5 is a view showing the format of a short burst; and

DETAILED DESCRIPTION OF THE PREFERRED EMBODIMENT

Figure 1:
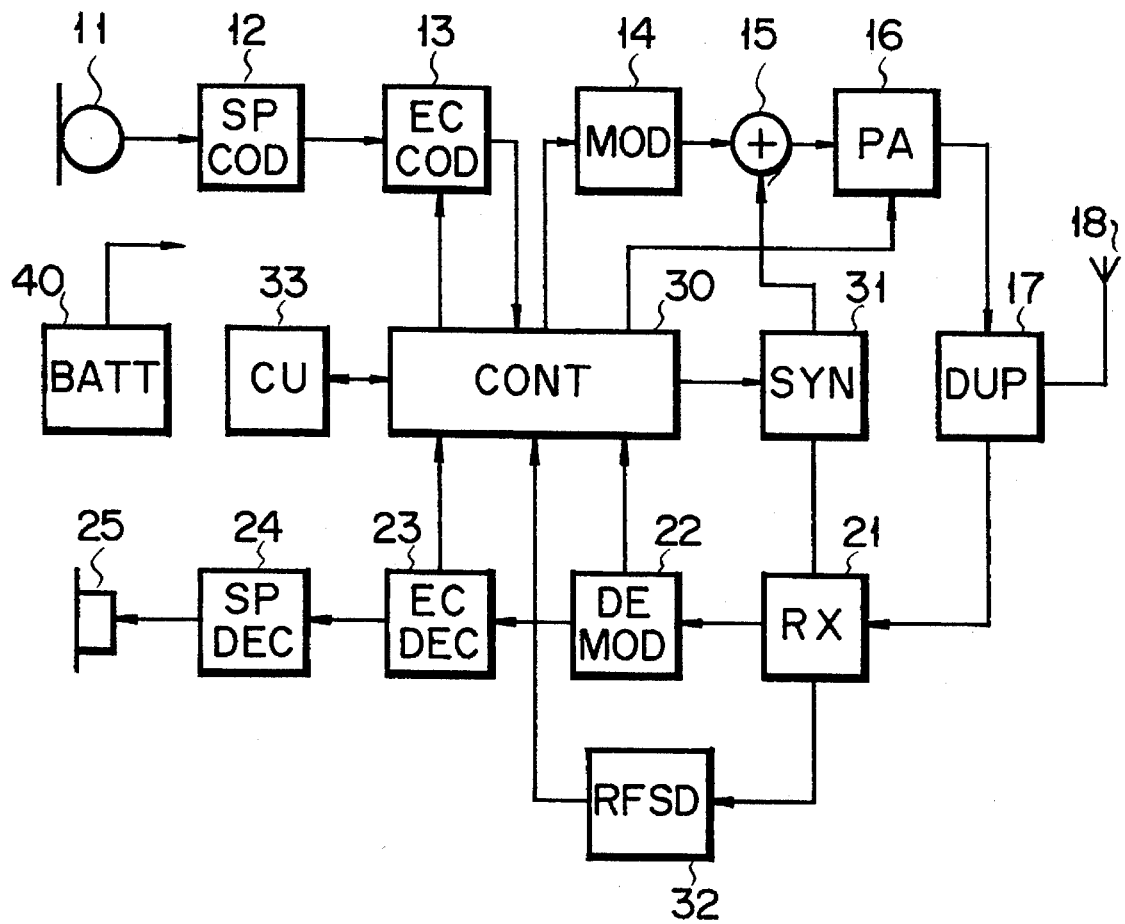
FIG. 1 is a block diagram showing a radio communication device using a data combination circuit according to an embodiment of the present invention.

As shown in FIG. 1, a radio communication device for a mobile station is roughly divided into a transmission system, a reception system, and a control system. The radio communication device is supplied with electric power from a battery 40 serving as a power supply.

The transmission system comprises a transmitter 11, a speech coder (SPCOD) 12 for receiving an output from the transmitter 11, an error correction coder (ECCOD) 13 for receiving an output from the speech coder 12, a digital modulator (MOD) 14, an adder 15 having a first input terminal for receiving an output signal from the digital modulator 14, a power amplifier (PA) 16 for receiving an output signal from the adder 15, a duplexer (DUP) 17 for receiving an output signal from the power amplifier 16, and an antenna 18 connected to the duplexer 17.

The speech coder 12 encodes a speech signal output from the transmitter 11. The error correction coder 13 performs error correction coding of a digital speech signal output from the speech coder 12 and a digital control signal output from a control circuit 30. The data obtained by this error correction coding process is supplied to the control circuit 30. In the control circuit 30, data requiring no error correction coding is added to the data obtained after the error correction coding process. The resultant data is supplied to the digital modulator 14. The digital modulator 14 generates a modulated signal corresponding to the transmission data supplied from the control circuit 30. The adder 15 adds the modulated signal to a carrier signal output from a frequency synthesizer 31, thus performing frequency conversion.

The power amplifier 16 amplifies the radio transmission signal output from the adder 15 to a predetermined transmission power. The duplexer 17 is rendered conductive only for a transmission time slot period designated by the control circuit 30, and supplies the radio transmission signal, output from the power amplifier 16, to the antenna 18 during this period with this operation, the radio transmission signal is transmitted from the antenna 18 to a base station (not shown).

The reception system comprises a receiver (RX) 21 for receiving a signal through the duplexer 17, a digital demodulator (DEM) 22 for receiving an output signal from the receiver 21, an error correction decoder (ECDEC) 23 for receiving a demodulated signal from the digital demodulator 22, a speech decoder (SPDEC) 24 for receiving the decoded signal from the error correction decoder 23, and a loudspeaker 25 for receiving an output signal from the speech decoder 24.

In the receiver 21, a radio signal received by the duplexer 17 through the antenna 18 is frequency-converted into an intermediate frequency signal. The digital demodulator 22 demodulates a received intermediate frequency signal output from the receiver 21. The demodulated signal is supplied to the error correction decoder 23. In the digital demodulator 22, bit synchronization and slot synchronization of the received intermediate frequency signals are performed, and the resultant sync signal is supplied to the control circuit 30. The error correction demodulator 23 performs error correction demodulation of the digital demodulated signal output from the digital demodulator 22. The received digital signal obtained by this error correction demodulation is supplied to the speech decoder 24, and a digital control signal is supplied to the control circuit 30. The speech demodulator 24 decodes the received digital signal. The received analog signal restored by this decoding process is output, as an audible sound, from the loudspeaker 25.

The control system comprises the control circuit (CONT) 30, the frequency synthesizer (SYN) 31, a received field strength detecting circuit (RFSD) 32, and a console unit (CU) 33 including a transmission request switch, dial keys, a liquid crystal display, and the like. The frequency synthesizer 31 generates local oscillation signals corresponding to the respective channel frequencies for control and speech communication which are designated by the control circuit 30. The received field strength detecting circuit 32 detects the received field strength of a wave transmitted from the base station. The detection signal is supplied to the control circuit 30 to perform free channel searching or extra-communication-area monitoring.

Figure 2:
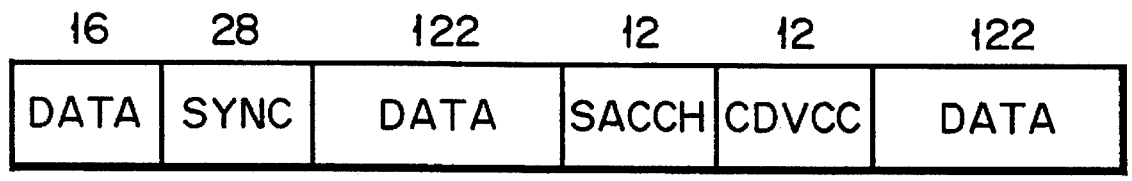
FIG. 2 is a view showing the format of slot data for speech communication.

Slot data transmitted from a mobile station device to a base station device during speech communication has a format as shown in FIG. 2. More specifically, 16-bit user data DATA is arranged at the start position, and a 28-bit sync signal SYNC, 122-bit user data DATA, 12-bit low-speed control data SACCH (Slow Associated Control Channel), and 12-bit collation code CDVCC (Coded Digital Verification Color Code) are subsequently arranged in the order named as described in IS-54A. At the end position, 122-bit user data DATA is arranged. Although not shown, guard time data G and ramp time data R, each consisting of six bits, are arranged at the start position of this slot data.

The sync signal SYNC and the collation code CDVCC are so-called fixed data whose contents are fixedly determined in advance in accordance with instructions from the base station. These data are transmitted without performing error correction coding. In contrast to this, the user data DATA and the low-speed control data SACCH are so-called unfixed data which can be arbitrarily formed by the mobile station and have contents varying in units of slots. These data are transmitted upon error correction coding. That is, slot data is a combination of fixed data and unfixed data. Therefore, when slot data is to be transmitted, these fixed and unfixed data must be combined by the control circuit 30.

A data combination (synthesis) circuit device for combining data in the above-described manner will be described next with reference to FIG. 3.

The data combination circuit device comprises a CPU 70 serving as the main control section of the control circuit 30 shown in FIG. 1, first, second, and third shift registers 71, 72, and 73, first and second buffer memories 74 and 75 connected to the CPU 70, a timing signal generator 76, an OR gate circuit 77, and first, second, and third clock gates 81, 82, and 83 arranged in correspondence with the shift registers 71, 72, and 73.

The first shift register 71 is connected to the CPU 70. The first shift register 71 temporarily holds unfixed data such as the user data DATA or the control data SACCH, converts the data into a serial data string, and outputs the data string. The register 71 has a storage capacity corresponding to the maximum length of unfixed data in one slot. The second shift register 72 is connected to the buffer 74 and is designed to temporarily hold the sync signal SYNC, convert the signal into a serial data string, and output the data string. The second shift register 72 has a storage capacity corresponding to the length (28 bits) of the sync signal SYNC. The third shift register 73 is connected to the buffer 75 and is designed to temporarily hold the collation code CDVCC, convert the code into a serial data string, and output the data string. The third shift register 73 has a storage capacity corresponding to the length (12 bits) of the collation code CDVCC. The buffer memories 74 and 75 store the sync signal SYNC and the collation code CDVCC as fixed data supplied from the CPU 70 in such a manner that these data can be repeatedly output. In response to read commands from the timing signal generator 76, these signals are read out from the buffer memories 74 and 75 to be parallelly transmitted to the shift registers 72 and 73.

The timing signal generator 76 generates timing signals TS1, TS2, and TS3 in synchronism with a slot sync signal supplied from the CPU 70, and supplies them to clock gates 81, 82, and 83, respectively. The timing signals TS1, TS2, and TS3 respectively designate the readout timings of the unfixed and fixed data, i.e., the sync signal SYNC and the collation code CDVCC, temporarily held in the shift registers 71, 72, and 73. The clock gates 81, 82, and 83 are enabled in accordance with the timing signals TS1, TS2, and TS3, thereby supplying shift clocks CLK to the shift registers 71, 72, and 73. Note that write and readout commands to be supplied to the buffer memories 74 and 75 are also generated by the timing signal generator 76.

Figure 4:
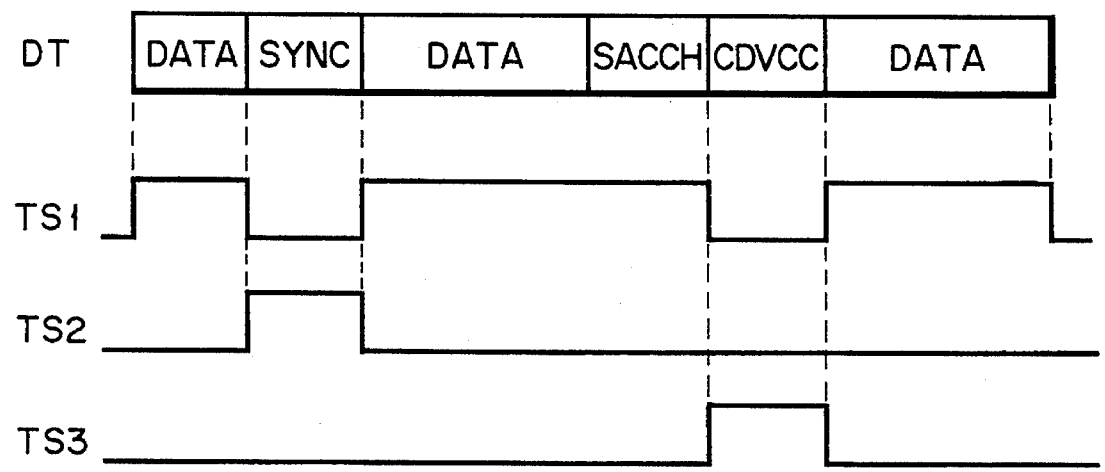
FIG. 4 is a timing chart for explaining an operation of the circuit shown in FIG. 3.

The OR gate circuit 77 combines the serial data strings shifted and output from the first, second, and third shift registers 71, 72, and 73 and supplies the resultant data, as slot data DT, to the digital modulator 14 shown in FIG. 4.

The control circuit 30 including the above-described data combination circuit is connected to the error correction coder 13, the digital modulator 14, the power amplifier 16, the digital demodulator 22, the error correction decoder 23, the frequency synthesizer 31, and the received field strength detecting circuit 32 through a bus 85 and an interface 86.

An operation of the circuit having the above-described arrangement will be described below.

When slot data for speech communication is to be transmitted, the CPU 70 forms the sync signal SYNC and the collation code CDVCC as fixed data, and supplies them to the buffer memories 72 and 73. At this time, write commands are output from the timing signal generator 76 to write the sync signal SYNC and the collation code CDVCC in the buffer memories 74 and 75, respectively. Upon completion of this write operation, readout commands are output from the timing signal generator 76 to read out the sync signal SYNC and the collation code CDVCC from the buffer memories 74 and 75, respectively, and the readout data are transmitted in parallel to the second and third shift registers 72 and 73.

In addition, the CPU 70 fetches the user data DATA and the control data SACCH to be transmitted in a transmission slot of the self-station from the error correction coder 13 in another preceding slot period, and transmits them in parallel to the first shift register 71.

When a transmission slot period of the self-station enters this state, the timing signals TS1, TS2, and TS3 are output from the timing signal generator 76 at the predetermined timing shown in FIG. 4 in accordance with the format of the speech communication slot data shown in FIG. 2 under the control of the CPU 70.

More specifically, the timing signal TS1 is set at "H" in the transmission period of the user data DATA arranged at the start position of the slot data DT. As a result, the clock gate 81 is enabled to supply the shift clock CLK to the shift register 71, and the user data DATA held in the shift register 71 is output in series. The serial data of the user data DATA is supplied to the digital modulator 14 through the OR gate circuit 77. Subsequently, in the transmission period of the sync signal SYNC, the timing signal TS2 is set at "H". In this case, therefore, the clock gate 82 is enabled to supply the shift clock CLK to the shift register 72, and the sync signal SYNC is output in series. The serial sync signal SYNC is supplied to the digital modulator 14 through the OR gate circuit 77, following the user data DATA.

Subsequently, in the same manner as described above, the timing signals TS1, TS2, and TS3 are selectively output from the timing signal generator 76 in accordance with the format of the slot data DT, so that the user data DATA, the control data SACCH, and the collation code CDVCC held in the shift registers 71, 72, and 73 are selectively shifted and output to the digital modulator 14 through the OR gate circuit 77. In this manner, the combining operation for the speech communication slot data DT in one slot is completed. Subsequently, the above-described operation is repeated at the transmission slot period of the self-station.

When the short burst data shown in FIG. 5, which includes unfixed data, i.e., the sync signal SYNC and the collation code CDVCC, and unfixed data measurement data OX4, OXS, OX12, and OX16, is to be transmitted, the CPU 70 forms fixed data, i.e., the sync signal SYNC and the collation code CDVCC, and supplies them to the buffer memories 72 and 73, similar to the case with the speech communication slot data. The sync signal SYNC and the collation code CDVCC are written in the buffer memories 74 and 75 in response to write commands generated by the timing signal generator 76. That is, the sync signal SYNC and the collation code CDVCC are stored such that they can be repeatedly output.

The CPU 70 then forms measurement data OX4, OX8, OX12, and OX16 as unfixed data, and transmits in parallel these data strings to the first shift register 71.

Figure 6:
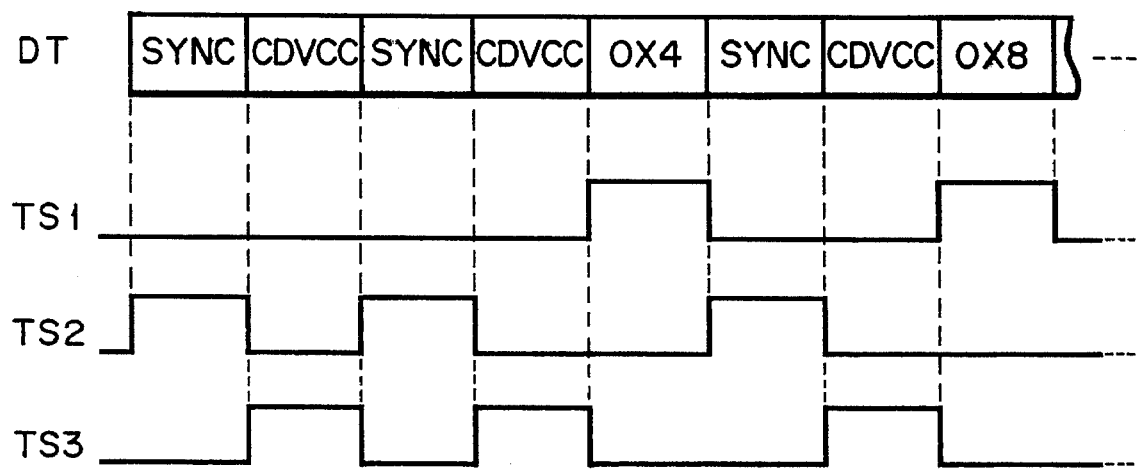
FIG. 6 is a timing chart for explaining an operation of the circuit shown in FIG. 3.

When a transmission slot period of the self-station comes in this state, the timing signals TS1, TS2, and TS3 are output from the timing signal generator 76 at the predetermined timing shown in FIG. 6 in accordance with the format of the short burst data shown in FIG. 5 under the control of the CPU 70.

More specifically, the timing signal TS2 is set at "H" in the transmission period of the sync signal SYNC at the start position. As a result, the clock gate 82 is enabled to supply the shift clock CLK to the shift register 72, and the sync signal SYNC held in the shift register 72 is output in series. The serial data string of the sync signal SYNC is supplied to the digital modulator 14 through the OR gate circuit 77, bus 85, and interface 86. Subsequently, in the transmission period of the collation code CDVCC, the timing signal TS3 is set at "H". As a result, the clock gate 83 is enabled to supply the shift clock CLK to the shift register 73, and the collation code CDVCC is output in series. The collation code CDVCC is supplied to the digital modulator 14 through the OR gate 77, bus 85, and interface 86, following the sync signal SYNC.

Every time transmission of the sync signal SYNC and the collation code CDVCC as fixed data is completed, readout commands are supplied to the buffer memories 74 and 75, respectively. As a result, the sync signal SYNC and the collation code CDVCC stored in the buffer memories 74 and 75 are respectively set again in the shift registers 72 and 73 immediately after the fixed data are shifted and output.

Subsequently, in the same manner as described above, the timing signals TS1, TS2, and TS3 are selectively output from the timing signal generator 76 in accordance with the format of short burst data, as shown in FIG. 6. With this operation, the measurement data, the sync signal SYNC, and the collation code CDVCC held in the shift registers 71, 72, and 73 are selectively shifted and output to the digital modulator 14 through the OR gate 77. Consequently, the combining process for the short burst data in one slot is completed, and the above-described operation is subsequently repeated every transmission slot period of the self-station.

As described above, according to this embodiment, the shift registers 72 and 73 for shifting and outputting the sync signal SYNC and the collation code CDVCC as fixed data are arranged independent of the shift register 72 for shifting and outputting unfixed data whose contents change in units of slots, and the timing signal TS1, TS2, and TS3 are selectively generated by the timing signal generator 76 in accordance with the format of slot data to be transmitted so as to shift and output the data held in the shift registers 71 and 72. Therefore, not only slot data of speech communication but also short burst data having different formats can obtained by a data combining process without posing any problem. In other words, both a combination circuit for speech communication slot data and a combination circuit for short burst data are not required, and the circuit arrangement can be simplified accordingly.

Since the buffer memories 74 and 75 are additionally arranged for the shift registers 72 and 73 for fixed data to hold the sync signal SYNC and the collation code CDVCC supplied from the CPU 70, the CPU 70 need not form the sync signal SYNC and the collation code CDVCC as fixed data for every slot. This reduces the processing load of the CPU 70.

In the above-described arrangement, the present invention is applied to a mobile station of a portable or mobile telephone system. However, the present invention can be applied to a base station or to a communication device of another type of mobile radio communication system. In addition, the present invention is not limited to a radio communication device but can be applied to a wired communication device or a data processor such as a computer.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data combination apparatus for use in a digital communications system, wherein data is transmitted in a predetermined format in time slots between a transmitting station and a receiving station, said apparatus comprising:

a first storage area for storing first data, the first data being variable from time slot to time slot;

a second storage area for storing second data including color code data, the second data being uniform from time slot to time slot;

timing means, coupled to said first storage area and said second storage area, for generating a plurality of timing signals and selectively supplying the timing signals to said first storage area and said second storage area to serially output the first data and the second data from said first storage area and said second storage area respectively, at predetermined timing intervals in accordance with the predetermined data format;

a data combining circuit, coupled to said first storage area and said second storage area, for serially combining data strings of the first data and the second data and outputting the serially combined data strings;

first switching means, for switching the timing signals from said timing means, a first timing signal being used for outputting the first data stored in said first data storage area to said data combining circuit; and second switching means, for switching the timing signals from said timing means, a second timing signal being used for outputting the second data stored in said second storage area to said data combining circuit, wherein for a data transmission, said data combining circuit combines the first data and the second data according to the switching of said first and second switching means and outputs first serially combined data strings during a first time period and second serially combined data strings during a second time period.

2. The apparatus of claim 1, wherein the first data includes user data and control channel data and the second data further includes synchronization data.

3. The apparatus of claim 2, wherein the user data includes digitized speech and the color code data includes coded digital verification color code data.

4. The apparatus of claim 1, wherein the predetermined format for a time slot includes the following serial data strings in order, first user's data, synchronization data, second user's data, slow associated control channel data, coded digital verification color code data, and third user's data.

5. The apparatus of claim 4, wherein the first data includes the first user's data, the second user's data, the slow associated control channel data, and the third user's data, and the second data includes the synchronization data and the color code data includes the coded digital verification color code data.

6. The apparatus of claim 1, wherein said first storage means includes a shift register for temporarily storing the first data.

7. The apparatus of claim 1, wherein said second storage means includes a buffer for storing the second data, the second data being repeatedly read out from said buffer in accordance with the timing signals from said timing means.

8. The apparatus of claim 1, wherein the data combining circuit includes a logic circuit.

9. The data combination apparatus according to claim 1, wherein the first time period is a predetermined time interval for time slots allocated to said data combination apparatus after the data transmission has started.

10. The data combination apparatus according to claim 9, wherein the second time period is a time interval between the end of the first time period and the end of the data transmission.

11. A method for combining data for use in a digital communications system, wherein data is transmitted in a predetermined format in time slots between a transmitting station and a receiving station, said method comprising the steps of:

storing first data in a first storage area, the first data being variable from time slot to time slot;

storing second data including color code data in a second storage area, the second data being uniform from time slot to time slot;

serially outputting the first data and the second data from said first storage area and said second storage area respectively, at predetermined timing intervals in accordance with the predetermined data format;

switching timing signals from a timing means, the timing signals being used for outputting the first data stored in the first storage area and for outputting the second data stored in the second storage area; and serially combining data strings of the first data and the second data, wherein the first data and the second data are combined according to the switching of timing signals from the timing means and, for a data transmission, first serially combined data strings are outputted during a first time period, and second serially combined data strings are outputted during a second time period.

12. The method for combining data according to claim 11, wherein the first time period is a predetermined time interval for time slots allocated to said data combination apparatus after the data transmission has started.

13. The method for combining data according to claim 12, wherein the second time period is a time interval between the end of the first time period and the end of the data transmission.

14. A radiotelephone apparatus for use in a system wherein data is transmitted in a predetermined format in time slots, said apparatus comprising:

means for sensing speech signals;

a speech coder for encoding the speech signals into digital speech data;

an error correction coder for performing error correction on the digital speech data;

a control circuit including, a first storage area for storing first data including the digital speech data, the first data being variable from time slot to time slot;

a second storage area for storing second data including color code data, the second data being uniform from time slot to time slot;

timing means, coupled to said first storage area and said second storage area, for generating a plurality of timing signals and selectively supplying the timing signals to said first storage area and said second storage area to serially output the first data and the second data from said first storage area and said second storage area respectively, at predetermined timing intervals in accordance with the predetermined data format; and a data combining circuit, coupled to said first storage area and said second storage area, for serially combining data strings of the first data and the second data and outputting the serially combined data strings as transmission data;

first switching means, for switching the timing signals from said timing means, a first timing signal being used for outputting the first data stored in said first data storage area to said data combining circuit;

second switching means, for switching the timing signals from said timing means, a second timing signal being used for outputting the second data stored in said second storage area to said data combining circuit: and a transmitting circuit coupled to said data combining circuit for outputting a radio transmission signal based on the transmission data, wherein the first data and the second data are combined according to the switching of said first and second switching means, and during a data transmission following either call origination made by said radiotelephone apparatus or incoming call reception by said radiotelephone apparatus, until call termination, a first transmission signal being outputted during a first time period, and a second transmission signal being outputted during a second time period.

15. The apparatus of claim 14, wherein the first data further includes control channel data and the second data further includes synchronization data.

16. The apparatus of claim 14, wherein the color code data includes coded digital verification color code data.

17. The apparatus of claim 14, wherein the predetermined format for a time slot includes the following serial data strings in order, first digitized speech data, synchronization data, second digitized speech data, slow associated control channel data, coded digital verification color code data, and third digitized speech data.

18. The apparatus of claim 17, wherein the first data includes the first digitized speech data, the second digitized speech data, the slow associated control channel data, and the third digitized speech data, and the second data further includes the synchronization data and the color code data includes the coded digital verification color code data.

19. The apparatus of claim 14, wherein said first storage means includes a shift register for temporarily storing the first data.

20. The apparatus of claim 14, wherein said second storage means includes a buffer for storing the second data, the second data being repeatedly read out from said buffer in accordance with the timing signals from said timing means.

21. The apparatus of claim 14, wherein the data combining circuit includes a logic circuit.

22. The apparatus of claim 14, wherein the first time period is a predetermined time interval prior to speech communication during the data transmission.

23. The apparatus of claim 22, wherein speech communication occurs during the second time period.

\* \* \* \* \*